April 6, 1954
R. M. SNOW
2,674,075
COTTON PICKER WITH AUTOMATIC ADJUSTING MEANS
Filed April 23, 1951
2 Sheets-Sheet 1
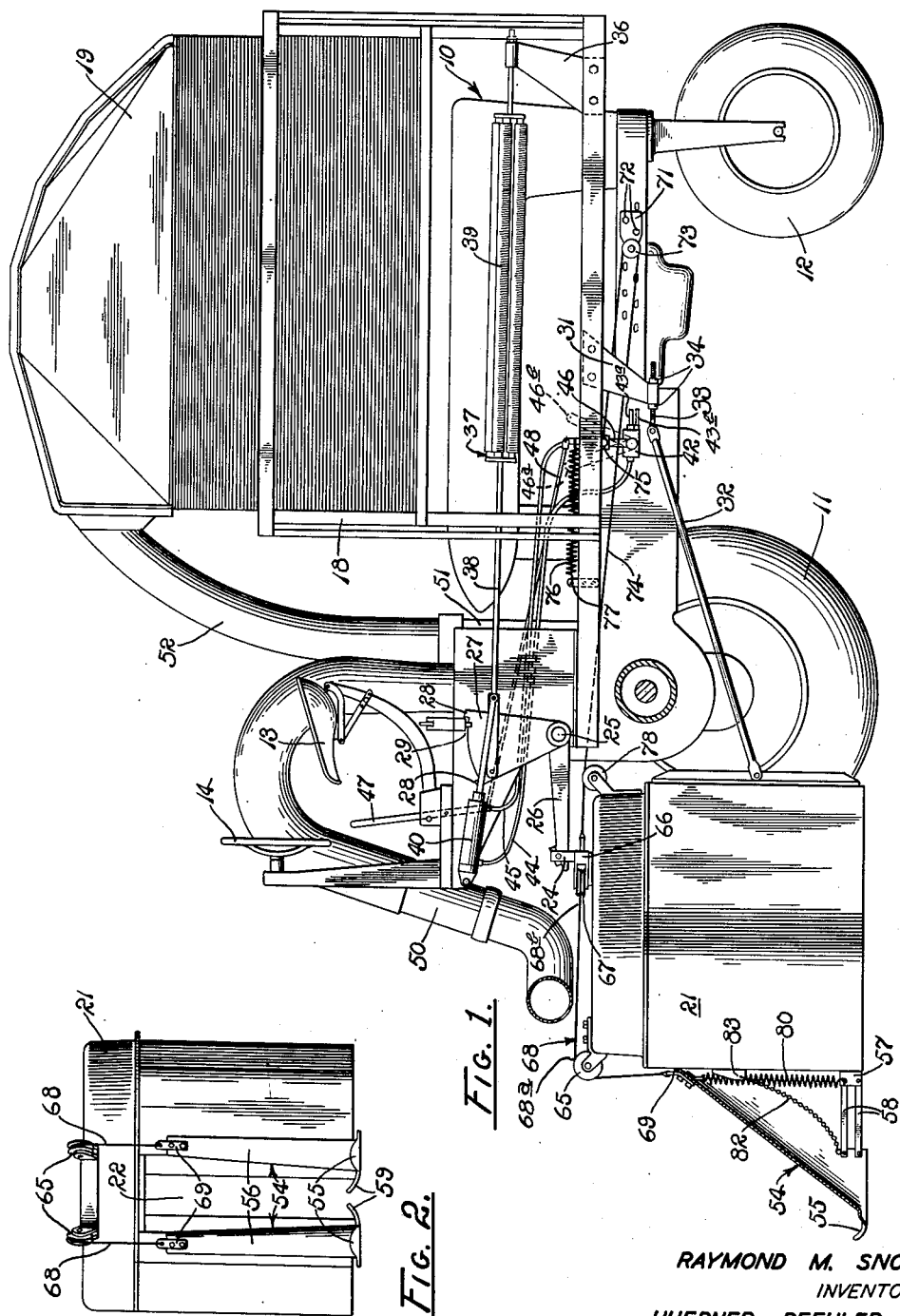
RAYMOND M. SNOW
INVENTOR
HUEBNER, BEEHLER,
WORREL & HERZIG
ATTORNEYS

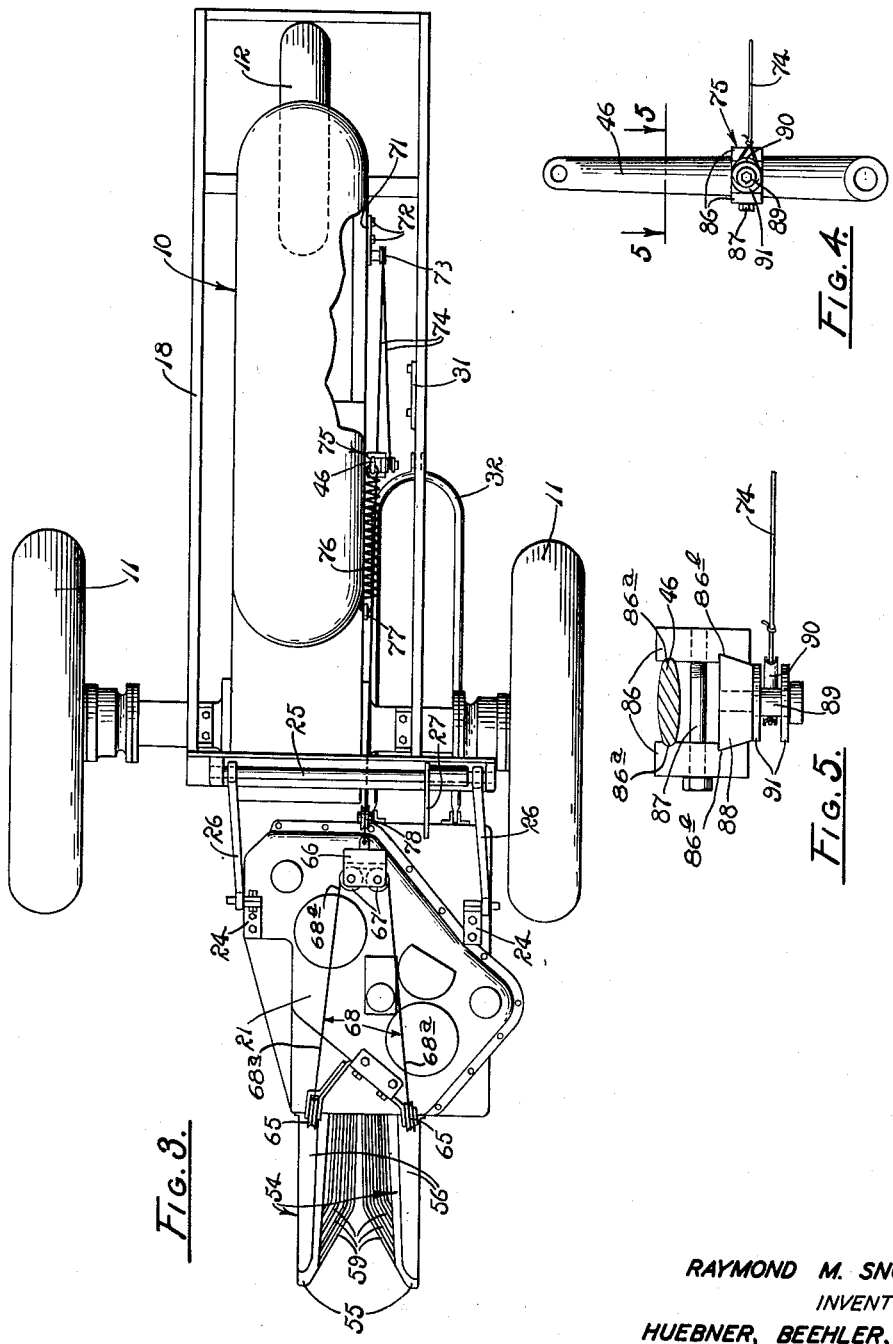

Patented Apr. 6, 1954

2,674,075

UNITED STATES PATENT OFFICE 2,674,075

COTTON PICKER WITH AUTOMATIC
ADJUSTING MEANS

Raymond M. Snow, Fresno, Calif.

Application April 23, 1951, Serial No. 222,492

10 Claims. (Cl. 56—11)

The present invention relates to mechanical cotton pickers and more particularly to a mechanism for automatically raising and lowering elevationally positionable picking units employed in cotton pickers in response to elevations and depressions in terrain traversed.

In conventional mechanical cotton pickers it is the usual practice to employ a support vehicle bearing a cotton retaining cage, to mount a picking mechanism on the vehicle and to interconnect the picking mechanism and cage by means of a duct through which a draft of air is forced to convey cotton from the picking mechanism to the cage. The picking mechanisms are of several forms, but have in common requirements for precise adjustment and are characterized by a frangibility subjecting the mechanisms to frequent structural failure. As a result of the delicate nature of the cotton picking mechanisms, it is a conventional practice to mount such mechanisms in a protective housing and to support the housing for earth traversing movement in a manner permitting operator controlled elevational positioning thereof.

Even skillful and well trained operators of mechanical cotton pickers frequently fail accurately to control the elevation of the picking mechanisms. If the mechanisms are caused to descend into earth engagement, serious damage thereto almost always results. If the picking mechanisms are excessively elevated, the picking efficiency is substantially reduced. The precise control requirements have placed such a premium on experienced operators that it has become the accepted practice for every prospective cotton picker operator to be required to undergo a period of training prior to being entrusted with commercial picking operations. The difficulties incident to the precise control of the elevation of picking mechanisms is aggravated by the usual provision of operational controls at a position conducive to ease in guiding the picker through a field but from which it is exceedingly difficult accurately to observe picking mechanism elevation.

An object of the present invention is to provide a mechanism adapted automatically to regulate the elevational support of cotton picking mechanisms in response to terrain traversed.

Another object is to provide for the automatic detection of elevational variations in the surface of the earth traversed by a mechanical cotton picker employing a picking mechanism and to translate such detection into elevational control of the picking mechanism whereby the mechanism is supported at an elevation above the earth surface to the mechanism and within the limits of operational efficiency.

Another object is to obviate cotton picking inefficiencies and damage to mechanical cotton pickers conventionally resulting from operator error.

Other objects and advantages are to provide improved elements and arrangements thereof in a device of the character and for the purposes set forth that is simple in structure, dependable in operation, economical to employ, and readily incorporated into conventional cotton pickers as an attachment.

Further objects and advantages will become apparent in the subsequent description in the specification.

In the drawings:

Fig. 1 is a side elevation of a substantially conventional cotton picker having the mechanism of the present invention attached thereto, a front wheel of the picker and a portion of a cotton delivery duct of the picker being removed for illustrative convenience.

Fig. 2 is a front elevation of a picking unit and a pair of plant lifters borne thereby employed in the picker shown in Fig. 1.

Fig. 3 is a plan view of the cotton picker and mechanism of the present invention shown in Fig. 1 having a portion of the cotton picker broken away to reveal elements of the present invention which would otherwise be obscured. As shown in Fig. 3, the mechanism of the present invention differs from Fig. 1 in that a yoke and elements associated therewith utilized in the mechanism are moved relatively rearwardly, as for elevating the picking unit relative to the picker.

Fig. 4 is an enlarged side elevation of a control arm for a hydraulic control valve partially hidden by framework in Fig. 1.

Fig. 5 is a section, on an enlarged scale, taken through the control arm on line 5—5 of Fig. 4 illustrating an adjustably positionable clamp mounted thereon.

Referring in greater detail to the drawings:

The cotton picker shown in Figs. 1 and 3 conventionally employs a support vehicle in the form of a tractor 10 having forward drive wheels 11 and a rear guide wheel 12. A seat 13 is mounted on the tractor for an operator of the picker in substantially elevated position above the front wheels 11. The operator is provided with a steering wheel 14 and other tractor and picker controls not directly related to operation of the subject invention and thus, for purposes of simplicity, not shown.

A substantially rectangular frame 18 is removably mounted on the tractor and supports a cotton collecting cage 19 of any suitable form. A picking unit, illustrated generally at 21, provides a plant receiving passage 22 therethrough. The present invention is not limited to any particular form of picking mechanism and thus such structural details are not illustrated in the drawing nor described. The picking unit contains any suitable form of picking mechanism.

A pair of brackets 24 are mounted in laterally spaced relation on the picking unit 21. A shaft 25 is rotatably mounted transversely on the frame 18 between the front wheels 11. Arms 26 are radially extended from the shaft 25 and individually pivotally connected to the brackets 24. As shown in Fig. 1, a sector arm 27 is upwardly extended from the shaft 25 and provides a pair of arcuately spaced radially extended studs 28. The sector arm with the arms 26 in effect constitute a bell-crank elevating means pivotal with the shaft 25 to raise and to lower the picking unit 21. Elevational movement of the picking unit is conveniently limited by mounting a stop 29 on the tractor intermediate the studs 28.

A pair of brackets 31 are downwardly extended from opposite sides of the frame 18 rearwardly of the picking unit 21. Radius rods 32 are pivotally connected to the picking unit and to the brackets by means of adjustable mounting screws 33 passed through the brackets and located in adjustable positions longitudinally of the frame 18 by nuts 34 mounted on the screws on opposite sides of the brackets. The radius rods 32 accommodate elevational movement of the picking unit by pivotal movement of the bell crank elevating means consisting of the sector arm 27, shaft 25 and arms 26. As the picking unit is raised and lowered by the elevating means, it obviously may tilt forwardly or rearwardly about the pivotal interconnections of the brackets 24 to the arms 26. The position of the picking unit as a result of any fore or aft tilting during elevational movement is referred to as its "attitude." The radius rods 32 pivotally interconnecting the mounting screws 33 and the picking unit 21 control the attitude of the unit at all elevational positions thereof. The adjustable positioning of the screws 33 longitudinally in the brackets 31 regulate the pivot points of the rearward ends of the radius rods 32 and thus regulate the attitude of the picking unit.

In order to counter-balance the weight of the picking unit, a bracket 36 is mounted on the frame 18 rearwardly of the sector arm 27 and a tension link 37, such as a rod 38 and tension springs 39, mounted between the bracket and the sector arm.

A two-way hydraulic ram 40 is pivotally connected between a portion of the tractor 10 and the rod 38 of the tension link 37. Any arrangement whereby controlled extension and contraction of the telescopically adjustable ram serves controllably to rock the shaft 25 is adequate for the purpose. The ram 40 with its hydraulic control system exemplifies suitable powered control means for raising and lowering the picking unit 21.

The tractor 10 conventionally employs a hydraulic control system containing hydraulic fluid and including a pump and sump for the hydraulic fluid, not shown. Such pumps and sumps have long been known and can conveniently take the form thereof shown in the patent to Ferguson, No. 2,118,181, issued May 24, 1938. A control valve 42 is mounted on the tractor 10, connected to the output of the pump, not shown, and to the sump by means of conduits 42a and 43b, respectively. The valve is connected to opposite ends of the ram 40 by means of a pair of conduits 44 and 45. The valve provides a control arm 46 mounted for pivotal movement forwardly and rearwardly of the tractor in a plane longitudinally of the tractor having a central upwardly extended neutral position; a forwardly inclined, ram expanding, picker unit raising position 46a; and a rearwardly inclined ram contracting, picker unit lowering position 46b. In the neutral position, the valve blocks fluid flow to and from the ram through the conduits 44 and 45. In the forward position 46a of the arm, the valve directs fluid to the ram through the conduit 44 from the conduit 43a connected to the pump to expand the ram to raise the picking unit while concurrently bleeding fluid from the opposite end of the ram back to the sump through the conduit 45, valve 42, and conduit 43b. In rearward position 46b of the arm, the valve directs fluid to the ram through the conduit 45 from the conduit 43a connected to the pump to contract the ram to lower the picking unit while bleeding fluid from the opposite end of the ram back to the sump through the conduit 44, valve 42, and conduit 43b.

An operator handle 47 of any suitable form is provided in convenient adjacent relation to the seat 13 and is connected to the control arm 46 of the valve 42 by a push-pull rod 48.

An inlet cotton delivery pipe 50 conventionally extends from the picking unit 21 to a blower 51 which serves to draw cotton from the picking unit to the blower. A delivery pipe 52 extends from the blower to the cage 19 and serves to convey cotton in an air blast from the blower to the cage.

It is the usual practice to drive a mechanical cotton picker of the type described so that the picking unit straddles a row of cotton and the plants thereof pass through the passage 22 during earth traversing movement of the picker. Because of the inherent growing characteristics of the cotton plant and damage thereto tending to depress its branches, it is necessary that the lowermost branches be lifted upwardly preparatory to movement through the passage. For this purpose a pair of plant lifters 54 are mounted on the picking unit 21 in forwardly extended positions on opposite sides of the passage 22. The plant lifters preferably include shoes 55 having upwardly turned forward end portions for sledlike passage over earth traversed and rearwardly and upwardly extended triangularly shaped legs 56. Each of the lifters is conveniently mounted for elevational movement while maintaining its initial attitude, that is without fore or aft tilting during elevational movement, by a plate 57 forwardly extended from the picking unit and a pair of parallel struts 58 pivotally interconnecting the lifter and its respective plate 57. Not only do the triangular legs provide a rearwardly inclined surface tending to lift the branches of cotton plants under which the shoes 55 are caused to pass, but a plurality of plant guides of rodlike form 59 are mounted in the shoes and extended rearwardly and upwardly therefrom to lift the cotton branches. The lifters exemplify suitable contour or soil elevation detecting means extended forwardly from the picking unit and slid over the ground in advance of the picking unit to warn of approached elevations and depressions.

The structure thus far described is essentially conventional and constitutes an operational environment in combination with certain portions of which the mechanism of the present invention functions.

A pulley 65 is rotatably mounted on the picking unit 21 above each of the lifters 54. A freely movable bifurcated yoke 66 is positioned in substantial alignment longitudinally of the vehicle rearwardly of a point substantially midway between the pulleys. A pair of laterally spaced sheaves 67 are mounted in the yoke for substantially horizontal rotational movement. A single sheave will suffice but a pair will assist in positioning the freely movable yoke. A flexible averaging cable 68 has opposite ends individually connected to the lifters 54, as by means of connectors 69. The averaging cable has intermediate portions 68a which extend from the lifters upwardly over their respective pulleys 65, and a central portion 68b extended about the sheaves 67 of the yoke 66.

A base plate 71 is mounted on the tractor 10 rearwardly of the valve 42, as by bolts 72. The plate mounts a second sheave 73 in spaced relation to the valve. A control cable 74 has an end connected to the yoke 66 intermediate its sheaves, is returned about the sheave 73, and has an opposite end forwardly extended and connected to the control arm 46 of the valve 42 by an adjustable clamp 75, subsequently described. A tension spring 76 has an end connected to the control arm 46 and an opposite end connected to the tractor at the side of the arm opposite to the control cable 74, as at 77. The spring 76 exemplifies resilient means generally suitable for the purpose. The spring serves to tension the control cable 74 and the averaging cable 68 against the weight of the lifters 54. The tension is adequate to suspend the yoke 66 and sheaves 67 free of the picking unit 21. To preclude objectionable swaying of the yoke and sheaves and support the same above the picking unit 21, a grooved guide wheel 78 is rotatably mounted on the picking unit rearwardly of the yoke and in substantial alignment between a point midway between the pulleys 65 and the second sheave 73 and receives the control cable 74 therein. The averaging cable 68, sheave or sheaves 67, and control cable 74 constitute a flexible tension control linkage interconnecting the detection means 54 and the control arm 44 of the valve 42.

In order to impart more positive operation to the device of the present invention, a loading spring 80 is connected between each of the plant lifters 54 and their respective mounting plates 57 under initial tension tending to force the lifters downwardly and further to tension the averaging cable 68 and control cable 74 against the spring 76. To limit downward movement on the lifters through extreme ranges, as when the picker is driven across a deep depression, a limit chain 82 interconnects each of the lifters 54 adjacent to the forward ends of the mounting struts 53 and a position thereabove on the picking unit 21, as at 83.

The control cable 74 is preferably connected to the control arm 46 in adjustably spaced relation to the pivotal mounting of the arm. This is conveniently accomplished by a clamp 75 shown in Figs. 4 and 5. The clamp consists of a pair of spaced plates 86 arranged on opposite sides of the arm interconnected by a constricting bolt 87. The plates are grooved as at 86a at one side of the bolt 87 in juxtaposition to receive the arm 46. Opposite to the bolt from the grooves 86a the plates are mitered at 86b to receive a block 88 in clamped engagement. A screw-threaded boss 89 is mounted in and extended from the block and mounts a grommet 90 between washers 91. The control cable 74 is fastened around the grommet. The bolt 87 is headed and slidably passed through one of the plates for screw-threaded engagement with the other. By tightening the bolt the plates are conveniently clamped on the arm in selected positions and against the block. It will be noted that the clamp and the other described structure of the automatic control mechanism is attachable to a conventional cotton picker with a minimum of effort.

*Operation*

The operation of the mechanism of the present invention is believed to be clearly apparent and is briefly summarized at this point. In conventional operation the picker is driven in straddling relation to a row of cotton and the plants thereof caused to pass through the passage 22. The elevation of the picking unit 21 is conventionally controlled solely by manipulation of the operating handle 47 and the resultant contraction and extension of the ram 40. In contrast to the inaccuracies previously described that result from human errors of judgment, the mechanism of the present invention serves automatically to regulate the elevation of the picking unit consistent with maximum picking efficiency and safety to the delicate picking mechanism.

When a picker incorporating the principles of the present invention, is driven in the usual manner, the shoes 55 are slidably pushed over the ground under opposite sides of a row of cotton. The weight of the lifters and the loading springs 80 assure continuous ground contact by the shoes, except when irregularities beyond the limits of the chain 82 are encountered. The lifters elevate branches of the cotton for movement through the passage 22 and the cotton is picked in the well-known manner.

When both of the shoes travel over an elevation, they move upwardly relieving the averaging cable 68 equally from opposite ends, permitting the control cable 74 to move rearwardly about the sheave 73 and under the tension effect of the spring 76 the control arm 46 positions the valve to deliver hydraulic fluid under pressure through the conduit 44 to the ram 40 while bleeding the opposite end of the ram through the conduit 45. This results in an extension of the ram rocking the shaft 25 and elevating the picking unit. It will be noted that as the picking unit raises relative to the lifters 54, the pulleys 65 draw the averaging cable equally from opposite ends moving the yoke 66 forwardly until a condition of balance is achieved and the operating arm returned to neutral, temporarily blocking fluid flow to and from the ram. It is worthy of note that automatic elevational movement of the picking unit results only from elevational displacement of the lifters, or other detecting means, from predetermined elevational relation to the picking unit.

When both of the lifters descend into a depression, the averaging cable 68 is drawn downwardly substantially equally at opposite ends tensioning the control cable 74 and drawing the control arm rearwardly in opposition to the tension of the spring 76. This results in a positive hydraulically actuated contraction of the ram and responsive lowering of the picking unit 21. As the pulleys 65 are lowered relative to the lifters 54 by lowering of the picking unit 21, both ends of the averaging cable are effectively slacked off permitting the control arm to return to neutral position again locking the ram.

When one of the lifters 54 passes over an elevation and the opposite lifter descends into a depression, the averaging cable 68 runs through the sheave 67. If their elevational movements are equal and opposite the averaging cable maintains substantially constant tension on the control cable 74 and the control arm 46 remains in position. If one of the lifts is elevated further than the other is lowered, the averaging effect of the cable 68 causes a relaxing of the tension on the control cable 74 to an extent corresponding to the difference in elevational movement permitting the operating arm 46 to move forwardly under the urging of the spring 76 resulting in an elevating of the picking unit. When one lifter 54 descends more than the other is elevated, the cable 68 again exercises an averaging effect but in this instance increases the tension on the control cable 74 to an extent corresponding to the difference in elevational movement, resulting in elevating of the picking unit.

Varied cotton conditions and operational environments modify the desired acuity of operation of the automatic control mechanism of the present invention. The acuity is conveniently adjusted by mounting the clamp 85 in adjusted positions on the control arm 46 radially of its pivotal mounting. The greater the radial spacing of the clamp from the pivot of the arm 46, the greater is the distance of travel of the control cable 74 required to effect a given operation. This results in decreased acuity. When increased acuity of control is desired, the clamp is moved radially inwardly on the control arm 46.

The mechanism of the present invention is fully automatic and successfully eliminates the difficulties incident to operator error. In actual operation, the mechanism has been found to increase the efficiency of conventional mechanical cotton pickers and at the same time to minimize damages to the picking unit 21 and contained mechanisms incident to ground engagement. The averaging effect attained has been found to eliminate violent fluctuations in the positioning of the picking unit and the adjustability of the acuity of operation highly desirable in accommodating widely varied operational conditions.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent devices and systems.

Having described my invention what I claim as new and desire to secure by Letters Patent is:

1. In a mechanical cotton picker including a support vehicle having forward and rearward end portions, a picking unit having a plant passage therethrough mounted on the vehicle for elevational movement relative thereto, a hydraulic ram mounted in the vehicle and operatively connected to the picking unit for controlled elevational positioning of the unit in the vehicle, a hydraulic system including the ram and a control valve connected in regulating relation to the ram, the valve having a control arm extended therefrom whereby elevational control of the picking unit is effected, and a pair of plant lifters mounted for independent elevational movement on the picking unit on opposite sides of the plant passage and forwardly extended therefrom; a control linkage comprising a flexible averaging cable having opposite ends connected individually to the plant lifters, a sheave having the averaging cable threaded therethrough intermediate the plant lifters and rearwardly thereof, a flexible control cable connected to the sheave and to the arm of the control valve, and a spring connected to the arm of the control valve and to a portion of the vehicle to the opposite side of the arm from the control cable, and tensioning said control cable between the sheave and the control arm and the averaging cable between the lifters and the sheave against the weights of the lifters.

2. In a mechanical cotton picker including a support vehicle having forward and rearward end portions, a picking unit having a plant passage therethrough, means mounting the picking unit on the vehicle in forwardly disposed position for elevational movement relative thereto, a contractile and extensile hydraulic ram connected to the mounting means adapted to raise and to lower the picking unit thereon, a hydraulic system connected to the ram including a control valve having a control arm extended therefrom whereby elevational control of the picking unit is effected by regulated contraction and extension of the ram, the valve being mounted in the vehicle rearwardly of the picking unit and the control arm being disposed for pivotal movement in a plane longitudinally of the vehicle, and a pair of plant lifters mounted for independent elevational movement on the picking unit on opposite sides of the plant passage and forwardly extended therefrom in earth engagement; the combination of a pulley mounted above each of the lifters on the picking units; a freely movable yoke positioned rearwardly of the pulleys in substantial alignment longitudinally of the vehicle with a point midway between the pulleys; a sheave mounted in the yoke for substantially horizontal rotational movement; a flexible averaging cable connected to one of the lifters, extended over said lifter's adjacent pulley, threaded about the sheave in the yoke, extended over the pulley of the opposite lifter, and connected to said opposite lifter; a flexible control cable connected to the yoke and to the control arm of the valve; a spring connected to the control arm urging pivotal positioning of the arm in a direction tensioning the cables against the weights of the lifters, and springs individually connected to the plant lifters and to the picking unit urging the lifters individually downwardly.

3. In a mechanical cotton picker having a support vehicle, a cotton picking unit, means mounted on the vehicle mounting the picking unit on the vehicle for elevational movement relative thereto, elevating means mounted in the vehicle connected to the picking unit movable to raise and to lower the picking unit in relation to the vehicle, a two-way ram connected to the elevating means, an hydraulic system connected to the ram and including a control valve having a control arm; a system for automatically controlling the elevation of the picking unit comprising a pair of soil elevation detection means, means mounting the detection means on the picking unit in forwardly extended ground engagement for independent elevational movement on the picking unit, an averaging cable interconnecting the detection means and having a central portion intermediate the detection means extended upwardly over the picking unit, a sheave engaged with said central portion of the cable intermediate the detecting means, a yoke rotatably mounting the sheave, a control cable connected to the yoke and to the control arm of the valve, and resilient means connected to the control arm tensioning the control cable between the yoke and the control lever, and tensioning the averaging cable between the yoke and the detection means.

4. In a mechanical cotton picker comprising a support vehicle, a cotton picking unit, means mounted on the vehicle suspending the picking unit on the vehicle for elevational movement relative thereto, a telescopically adjustable hydraulic ram, means connecting the ram to the picking unit whereby telescopic adjustment of the ram elevationally positions the picking unit in the vehicle, a hydraulic system containing hydraulic fluid connected to the ram including a control valve in the hydraulic system providing a control arm having a neutral position in which flow of hydraulic fluid to and from the ram is blocked to lock the picking unit in adjusted elevational position, a depressing position in which the valve directs hydraulic fluid to the ram to lower the picking unit, and a raising position in which the valve directs hydraulic fluid to the ram in a direction to raise the picking unit; the combination of a pair of soil elevation detection means forwardly extended from the picking unit in ground engagement, means mounted on the picking unit individually mounting the soil elevation detection means on the picking unit for elevational movement relative thereto, a pulley rotatably mounted on the picking unit in elevational spaced relation to each of the soil elevation detection means, a grooved guide wheel rotatably mounted on the picking unit in horizontally spaced relation to the pulleys and rearwardly thereof, an averaging cable having opposite ends connected to the detection means and an intermediate portion extended upwardly over said means respective pulleys, a sheave engaged with the averaging cable between the pulleys individual to the soil elevation detection means, a yoke connected to the sheave, a control cable connected to the yoke and to the control arm of the hydraulic valve rested in the grooved wheel between the yoke and arm, and a spring connected to the control arm and to the vehicle urging the control arm in a direction tensioning the averaging cable between the detection means and the sheave in the yoke and the control cable between the yoke and the control arm.

5. In a mechanical cotton picker adapted for earth traversing movement in a predetermined direction in relation thereto having a picking unit mounted thereon for adjustable elevational movement and powered means mounted in the picker and connected to the picking unit adapted selectively to raise and to lower the picking unit in the picker and providing a control arm having a neutral position, a picking unit raising position, and a picking unit lowering position; the combination of a soil elevation detection means; means mounting the detection means on the picker in ground engagement forwardly of the picking unit for floating elevational movement independently of the picker and picker unit; a spring operatively associated with the control lever for urging said lever toward picking unit raising position; and a control linkage interconnecting the detection means and the control lever adapted to release the arm to move to raising position under the urging of the spring when the detection means raises relative to the picking unit and to move the arm to lowering position against the urging of the spring when the detection means descends relative to the picking unit.

6. In a mechanical cotton picker adapted for earth traversing movement in a predetermined direction in relation thereto having a picking unit mounted thereon for adjustable elevational movement and powered means mounted in the picker and connected to the picking unit adapted selectively to raise and to lower the picking unit in the picker and providing a control arm having a neutral position, a picking unit raising position, and a picking unit lowering position: The improvement which comprises a pair of soil elevation detection means mounted on the picking unit for individual elevational movement relative thereto and forwardly extended therefrom, a spring connected to each of the detection means and to the picking unit urging the detection means downwardly into soil engagement, a freely movable yoke positioned above the picking unit rearwardly of the detection means, a sheave rotatably mounted in the yoke, an averaging cable having opposite ends individually connected to the detection means and a central portion extended through the yoke and engaged with the sheave, a control cable connected to the yoke and to the control arm of the powered means, and a spring connected to the control arm tensioning the averaging cable between the detection means, and the control cable between the yoke and the control lever.

7. In a mechanical cotton picker adapted for earth traversing movement in a predetermined direction in relation thereto having a picking unit mounted thereon for adjustable elevational movement providing a plant passage therethrough and powered means mounted in the picker and connected to the picking unit adapted selectively to raise and to lower the picking unit in the picker and providing a control arm having a neutral position, a picking unit raising position, and a picking unit lowering position; the combination of a soil elevation detection means; means mounting the detection means on the picking unit forwardly of the picking unit for floating elevational movement independently of the picker and picking unit and in ground engagement; a spring connected to each of the soil elevation detection means and to the picking unit urging said detection means downwardly relative to the picking unit; a pulley mounted for rotation about a substantially horizontal axis on the picking unit above each of the detection means; a grooved wheel mounted for rotational movement about a substantially horizontal axis in substantially equally spaced relation to the pulleys and rearwardly thereof; a bifurcated yoke positioned between the pulleys and the grooved wheel; a sheave rotatably mounted about a substantially vertical axis in the bifurcated yoke; an averaging cable having opposite ends individually connected to the detection means providing intermediate portions extended upwardly over the pulleys of the respective detection means and a central portion extended through the yoke about the sheave therein; a control cable having an end connected to the yoke, extended over the grooved wheel, and having an opposite end connected to the control arm of the powered means for raising and lowering the picking unit; and a tension spring connected to the control arm urging the arm toward picking unit raising position and tensioning the averaging cable between the detection means, and tensioning the control cable between the yoke and the control arm.

8. In a mechanical cotton picker adapted for earth traversing movement in a predetermined direction in relation thereto, having a picking unit mounted thereon for adjustable elevational movement providing a plant passage therethrough, powered control means mounted in the picker and connected to the picking unit adapted selectively to raise and to lower the picking unit in the picker including a control arm having a neutral position, a picking unit raising position, and a picking unit lowering position; the combination of a pair of soil elevation detecting means forwardly extended from the picking unit on opposite sides of the passage thereof; means mounting the soil elevation detection means and the picking unit for free elevational movement of said detection means relative to the picking unit; a spring connected to each of the soil elevation detection means and to the picking unit urging said detection means downwardly relative to the picking unit; a pulley mounted for rotation about a substantially horizontal axis transversely of the direction of movement of the picker above each of the detection means; a grooved guide wheel mounted for rotational movement above a substantially horizontal axis transversely of the tractor in substantially equally spaced relation to the pulleys and rearwardly thereof; a bifurcated free floating yoke positioned between the pulleys and the grooved wheel; a sheave rotatably mounted about a substantially vertical axis in the bifurcated yoke; an averaging cable having oposite ends individually connected to the detection means, intermediate portions extended upwardly over the pulleys of the respective detection means, and a central portion positioned about the sheave in the yoke; a second sheave rotatably mounted on the picker in rearward alignment with the grooved wheel rearwardly of the control arm; a control cable having an end connected to the yoke extended rearwardly therefrom over the grooved wheel, about the second sheave rearwardly of the grooved wheel, and forwardly extended therefrom and connected to the control arm of the powered control means; a tension spring having an end connected to the control arm and an opposite end connected to the picker forwardly of the arm; an operator handle pivotally mounted in the picker; and a push-pull rod pivotally interconnecting the operator handle and the control arm.

9. In a mechanical cotton picker adapted for earth traversing movement in a predetermined direction in relation thereto having a picking unit mounted thereon for adjustable elevational movement, and powered control means mounted in the picker and connected to the picking unit adapted selectively to raise and to lower the picking unit in the picker and providing a control arm having a neutral position, a picking unit raising position, and a picking unit lowering position; the combination of a soil elevation detection means; means mounting the detection means in ground engagement on the picking unit forwardly of said unit for floating elevational movement independently of the picking unit; resilient means connected to the control arm urging the arm toward picking unit raising position; and a flexible tension linkage interconnecting the detection means and the control arm whereby the weight of the detection means is exerted on the arm in opposition to the resilient means.

10. In a mechanical cotton picker adapted for earth traversing movement in a predetermined direction in relation thereto having a picking unit mounted thereon for adjustable elevational movement providing a plant passage therethrough, and powered control means mounted in the picker and connected to the picking unit adapted selectively to raise and to lower the picking unit in the picker and providing a control arm having a neutral position, a picking unit raising position, and a picking unit lowering position; the combination of a pair of soil elevation detecting means forwardly extended from the picking unit on opposite sides of the passage thereof; means interconnecting the soil elevation detection means and the picking unit for free elevational movement of said detection means relative to the picking unit; a spring connected to each of the soil elevation detection means and to the picking unit individually urging said detection means downwardly relative to the picking unit; a pulley mounted for rotation about a substantially horizontal axis transversely of the direction of movement of the picker on the picking unit above each of the detection means; a grooved guide wheel mounted for rotational movement about a substantially horizontal axis transversely of the picker in substantially equally spaced relation to the pulleys and rearwardly thereof; a bifurcated free floating yoke positioned between the pulleys and the grooved wheel; a sheave rotatably mounted about a substantially vertical axis in the bifurcated yoke; an averaging cable having opposite ends individually connected to the detection means, intermediate portions extended upwardly over the pulleys of the respective detection means, and a central portion positioned about the sheave in the yoke; a second sheave rotatably mounted on the picker in rearward alignment with the guide wheel rearwardly of the control arm; a control cable having an end connected to the yoke, extended over the guide wheel, about the sheave rearwardly of the grooved wheel, and forwardly extended therefrom and connected to the control arm of the powered control means; and a tension spring having an end connected to the control arm and an opposite end connected to the picker forwardly of the arm urging the arm toward picking unit raising position, tensioning the averaging cable between the detection means and the yoke, and tensioning the control cable between the yoke and the control arm about the second sheave.

References Cited in the file of this patent

UNITED STATES PATENTS

| Number | Name | Date |
|---|---|---|
| 1,959,070 | Thomann | May 15, 1934 |
| 2,088,676 | White | Aug. 3, 1937 |
| 2,101,100 | Rust et al. | Dec. 7, 1937 |
| 2,214,818 | Johnston | Sept. 17, 1940 |
| 2,247,687 | Johnston | July 1, 1941 |
| 2,399,718 | Baker et al. | May 7, 1946 |
| 2,482,216 | Rust | Sept. 20, 1949 |